US007525698B2

(12) United States Patent
Horaguchi

(10) Patent No.: US 7,525,698 B2
(45) Date of Patent: Apr. 28, 2009

(54) IMAGE READING APPARATUS

(75) Inventor: Yoichi Horaguchi, Tajimi (JP)

(73) Assignee: Brother Kogyo Kabushiki Kaisha, Nagoya (JP)

( * ) Notice: Subject to any disclaimer, the term of this patent is extended or adjusted under 35 U.S.C. 154(b) by 701 days.

(21) Appl. No.: 11/032,133

(22) Filed: Jan. 11, 2005

(65) Prior Publication Data
US 2005/0152010 A1 Jul. 14, 2005

(30) Foreign Application Priority Data
Jan. 14, 2004 (JP) ............................. 2004-007271

(51) Int. Cl.
H04N 1/00 (2006.01)
(52) U.S. Cl. .................. 358/474; 358/497; 358/468; 235/462.43
(58) Field of Classification Search ................ 358/496, 358/497, 498, 468, 474; 346/139; 347/130; 399/75, 107, 124, 367
See application file for complete search history.

(56) References Cited

U.S. PATENT DOCUMENTS

| 4,429,333 | A | * | 1/1984 | Davis et al. | 358/496 |
| 4,500,197 | A | * | 2/1985 | Dannatt | 399/211 |
| 4,623,937 | A | * | 11/1986 | Watanabe | 358/483 |
| 4,704,638 | A | * | 11/1987 | Igarashi | 358/296 |
| 4,908,717 | A | * | 3/1990 | Natori | 358/474 |

(Continued)

FOREIGN PATENT DOCUMENTS

CN   1222026 A   7/1999

(Continued)

OTHER PUBLICATIONS

"Epson Expression 1600 User's Guide", 2000, Epson America, Inc. pp. 20, 53, 57, 57, 93-96, 101, 102, 104, 109, 110, 133.*

Primary Examiner—Kimberly A Williams
(74) Attorney, Agent, or Firm—Oliff & Berridge, PLC

(57) ABSTRACT

An image reading apparatus including a housing; an image taking device which is provided in the housing; a power producing device which is provided in the housing and which produces a power to move the image taking device; a first reading control portion which controls the power producing device to move the image taking device relative to a first sheet placed on a first reading place, so that the image taking device takes the first image from the first sheet; a second-sheet feeding device at least a portion of which is provided right above the second reading place and which feeds a second sheet to a second reading place; and a second reading control portion which controls, in a state in which the image taking device is positioned at a position right below the second reading place, the second-sheet feeding device to feed the second sheet to the second reading place, and controls, when the second sheet is fed through the second reading place, the image taking device to take the second image from the second sheet. The power producing device is provided, in a portion of the housing that is different from a portion thereof located right below the first reading place, at a position assuring that a projection of at least a portion of the power producing device in a direction parallel to a direction in which the image taking device is moved is formed on the image taking device.

20 Claims, 9 Drawing Sheets

U.S. PATENT DOCUMENTS

| | | | | |
|---|---|---|---|---|
| 5,055,880 A | * | 10/1991 | Fujiwara | 399/203 |
| 5,311,015 A | * | 5/1994 | Takeuchi | 250/234 |
| 5,339,139 A | * | 8/1994 | Fullerton et al. | 399/203 |
| 5,610,731 A | * | 3/1997 | Itoh | 358/496 |
| 5,734,483 A | * | 3/1998 | Itoh | 358/496 |
| 6,631,014 B1 | * | 10/2003 | Aoshima et al. | 358/497 |
| 6,892,945 B2 | | 5/2005 | Shishido | |
| 6,901,237 B2 | * | 5/2005 | Nakamura | 399/367 |
| 7,051,941 B2 | * | 5/2006 | Yui | 235/462.43 |
| 7,161,716 B1 | * | 1/2007 | Kawasaki et al. | 358/474 |
| 7,202,983 B2 | * | 4/2007 | Yokota et al. | 358/496 |
| 2002/0054380 A1 | * | 5/2002 | Takeuchi et al. | 358/498 |
| 2004/0057079 A1 | * | 3/2004 | Ohsawa | 358/2.1 |
| 2004/0170456 A1 | * | 9/2004 | Choi | 399/367 |
| 2004/0178268 A1 | * | 9/2004 | Yui | 235/454 |
| 2004/0184118 A1 | * | 9/2004 | Sato | 358/497 |

FOREIGN PATENT DOCUMENTS

| | | |
|---|---|---|
| CN | 2354299 Y | 12/1999 |
| EP | 309175 A2 * | 3/1986 |
| EP | 795816 A1 * | 9/1997 |
| JP | A 60-030259 | 2/1985 |
| JP | A 10-271329 | 10/1998 |
| JP | A 2001-285596 | 10/2001 |
| JP | A 2003-131456 | 5/2003 |
| JP | A 2003-134307 | 5/2003 |

* cited by examiner

FIG.7A
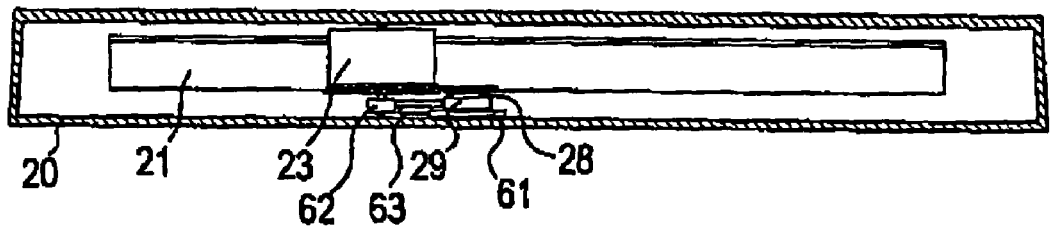
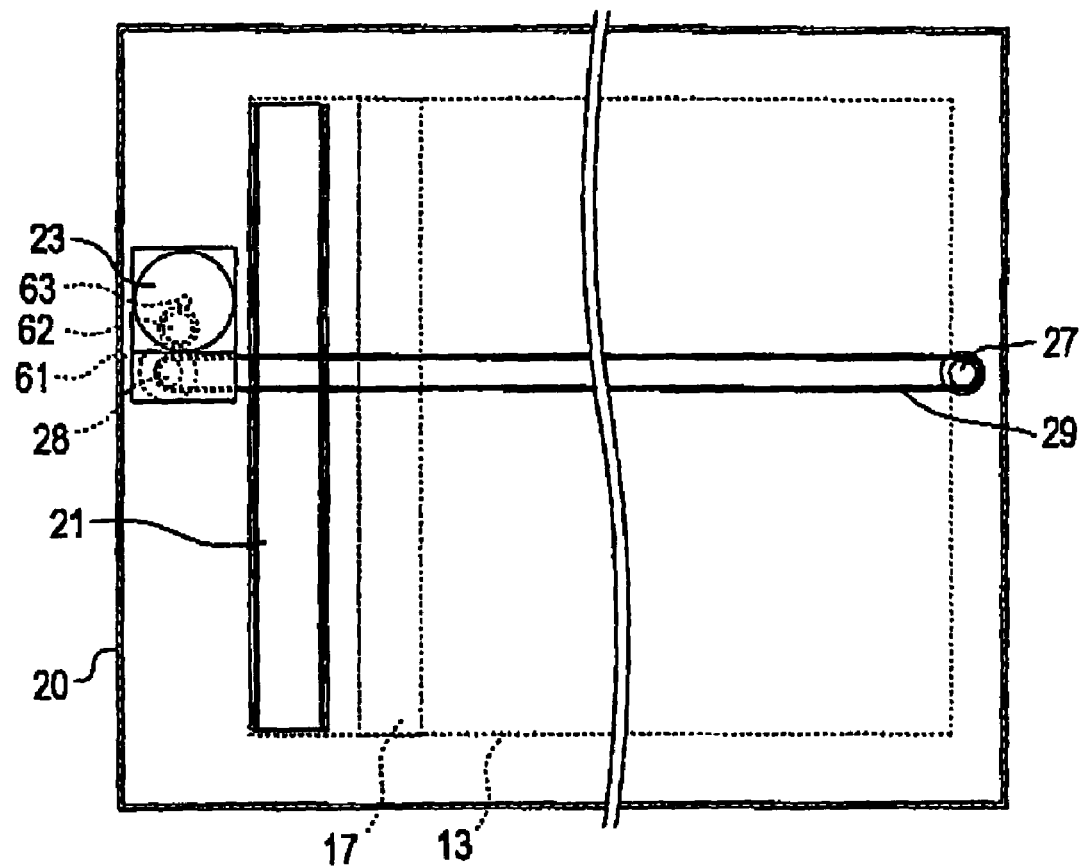
FIG.7B

IMAGE READING APPARATUS

The present application is based on Japanese Patent Application No. 2004-007271 filed on Jan. 14, 2004, the contents of which are incorporated herein by reference.

BACKGROUND OF THE INVENTION

1. Field of the Invention

The present invention relates to an image reading apparatus that optically reads, with an image taking device, an image on, e.g., an original.

2. Discussion of Related Art

There has conventionally been known an image reading apparatus including a glass plate defining a reading place on which an original having an image is placed; an image taking device that is provided below the glass plate and optically takes the image; and an image processor that produces image data based on the image taken by the image taking device. There has also been known another image reading apparatus additionally including an original feeding device (ADF; automatic document feed) that feeds an original to be read, to a reading place.

For example, Patent Document 1 (Japanese Patent Application Publication P2001-285596A1) discloses an image reading apparatus including an image taking device and an original feeding device, and having a first reading place and a second reading place. In this image reading apparatus, the image taking device, positioned below the first reading place, is moved to read an image on an original placed by a user on the first reading place. The original feeding device is used in such a manner that an original placed on a sheet-supply tray of the original feeding device is fed to the second reading place and, when the original is fed through the second reading place, the image taking device, positioned below the second reading place, reads an image on the original.

Meanwhile, there has been known a technique in which an image taking device is moved using an electric motor. For example, Patent Document 2 (Japanese Patent Application Publication P2003-131456A1) discloses a copying machine in which a CIS (contact image sensor) as an image taking device is moved using an electric motor (e.g., a reader motor) provided below a space in which the CIS is moved.

SUMMARY OF THE INVENTION

However, in the copying machine disclosed by the above-indicated Patent Document 2, the electric motor used to move the CIS is provided below the space in which the CIS is moved. Thus, a housing that accommodates the CIS and the motor needs to have, in a vertical direction, a first space in which the CIS is moved and a second space in which the motor is provided. Thus, in the case of the image reading apparatus having the first and second reading places, if the electric motor is provided below the space in which the image taking device is moved, the image reading apparatus needs to have a great thickness in a vertical direction and thereby have a large size.

In the above-described technical background, the present invention has been developed. It is therefore an object of the present invention to provide an image reading apparatus which is free of at least one of the above-indicated problems. It is another object of the present invention to provide an image reading apparatus in which a power producing device (e.g., an electric motor) that produces power to move an image taking device is provided at an advantageous position to reduce a thickness of the apparatus. It is another object of the present invention to provide an image reading apparatus that need not increase a dimension thereof in a direction perpendicular to the direction of thickness thereof and can enjoy a small size.

According to the present invention, there is provided an image reading apparatus comprising a housing having an inner space; an image taking device which is provided in the inner space of the housing and which takes each of a first image on a first sheet placed on a first reading place and a second image on a second sheet fed to a second reading place; a power producing device which is provided in the inner space of the housing and which produces a power to move the image taking device to each of the first reading place and the second reading place; a first reading control portion which controls the power producing device to move the image taking device relative to the first sheet placed on the first reading place, so that the image taking device takes the first image from the first sheet; a second-sheet feeding device at least a portion of which is provided right above the second reading place and which feeds the second sheet to the second reading place; and a second reading control portion which controls, in a state in which the image taking device is positioned at a position right below the second reading place, the second-sheet feeding device to feed the second sheet to the second reading place, and controls, when the second sheet is fed through the second reading place, the image taking device to take the second image from the second sheet. The power producing device is provided, in a second portion of the inner space of the housing that is different from a first portion of the inner space that is located right below the first reading place, at a position assuring that a projection of at least a portion of the power producing device in a projection direction parallel to a movement direction in which the image taking device is moved by the power producing device, is formed on the image taking device.

In the image reading apparatus constructed as described above, the power producing device is provided in the portion of the inner space of the housing which portion is not located below the first reading place, such that when at least a portion of the power producing device is projected in the projection direction parallel to the movement direction in which the image taking device is moved, the projection of the portion of the power transmitting device is formed on the image taking device. That is, the power producing device is provided in a space that is extended, in the movement direction, from the space in which the image taking device is moved. Therefore, as compared with a conventional image reading apparatus in which a power producing device is provided below a space in which an image taking device is moved, the present image reading apparatus can enjoy a reduced thickness in a direction perpendicular to the movement direction and the two reading places. Thus, the image reading apparatus in accordance with the present invention can have a flatter configuration and a smaller size and accordingly can be used more easily.

BRIEF DESCRIPTION OF THE DRAWINGS

The above and optional objects, features, and advantages of the present invention will be better understood by reading the following detailed description of the preferred embodiments of the invention when considered in conjunction with the accompanying drawings, in which:

FIG. 7A is a cross-section view of the main body 3, taken in a front-rear direction thereof;

FIG. 7B is a cross-section view of the main body 3, taken along A-A' in FIG. 3A;

DETAILED DESCRIPTION OF THE PREFERRED EMBODIMENTS

Figure 1A:
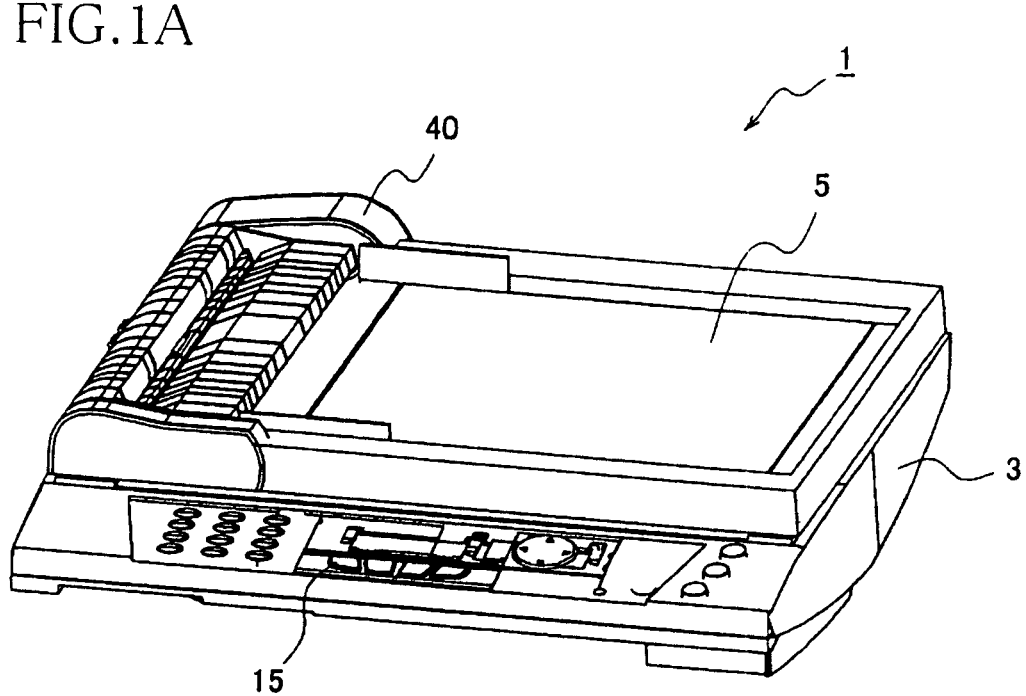
FIG. 1A is a perspective view of an external appearance of an image reading apparatus 1 as a first embodiment of the present invention, in a state in which a main-body cover 5 is closed to cover a main body 3.
Figure 1B:
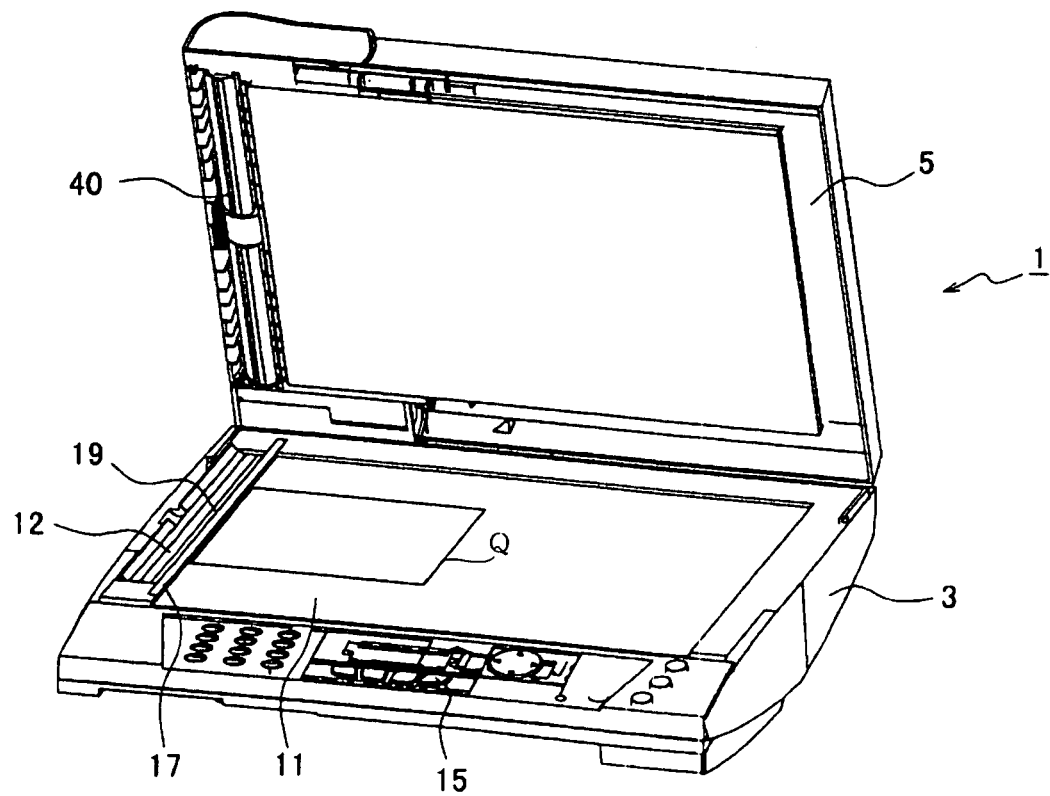
FIG. 1B is a perspective view of another external appearance of the image reading apparatus 1 in a state in which the main-body cover 5 is opened to expose the main body 3.
Figure 2:
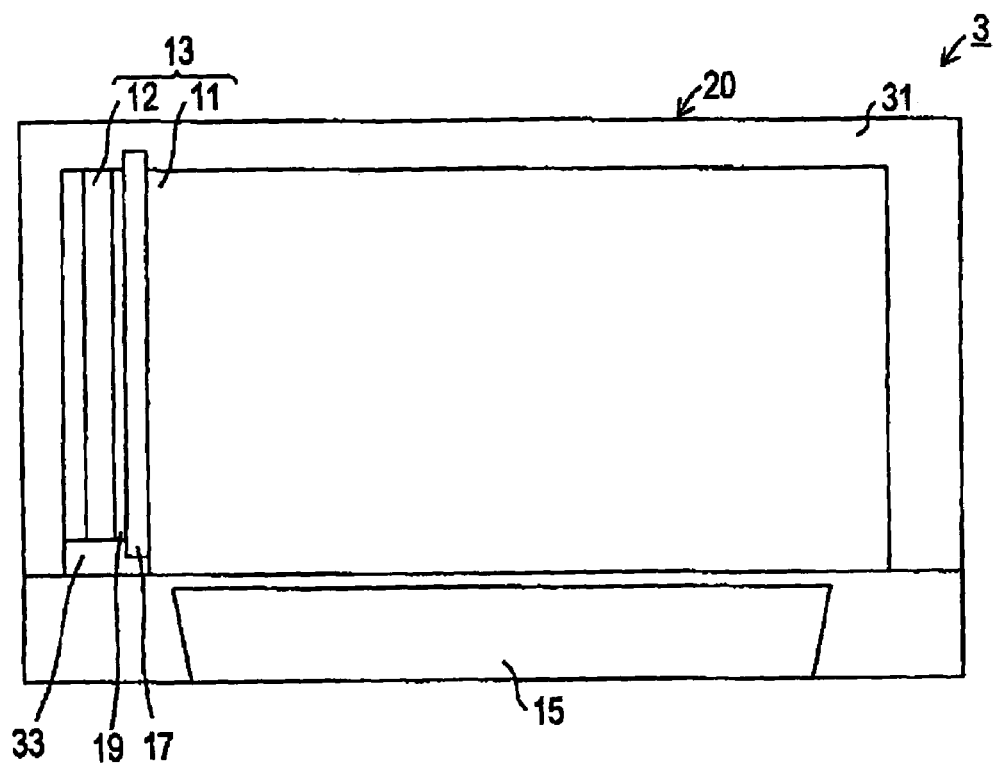
FIG. 2 is a plan view of an upper portion of the main body 3.

Hereinafter, there will be described preferred embodiments of the present invention by reference to the drawings. FIGS. 1A and 1B show an external appearance of an image reading apparatus 1 to which the present invention is applied; and FIG. 2 shows an upper portion of a main body 3 of the image reading apparatus 1.

The image reading apparatus 1 is so constructed as to function as a so-called "flat-bed-type" scanner apparatus, and includes the main body 3 and a main-body cover 5 that is provided above the main body 3 such that the cover 5 is pivotable relative to the main body 3 so as to open and close the same 3. The main body 3 has, in the upper portion thereof, a first image-read place 11, indicated by "A" in FIG. 3B, and a second image-read place 12, indicated by "B".

As shown in FIG. 1A, the upper portion of the main body 3 can be covered by the main-body cover 5 being closed. A user manually closes the main-body cover 5 to cover the main body 3, when he or she operates the image reading apparatus 1 to read an image formed on an original O (shown in FIGS. 1B and 3B. FIG. 1A shows the image reading apparatus 1 in a state in which the main-body cover 5 is closed; and FIG. 1B shows the image reading apparatus 1 in a state in which the main-body cover 5 is opened.

The main body 3 has, in a front portion thereof, an operation panel 15 including various keys and switches. When the user inputs a command by operating the operation panel 15, the image reading apparatus 1 carries out an operation corresponding to the inputted command.

Figure 3A:
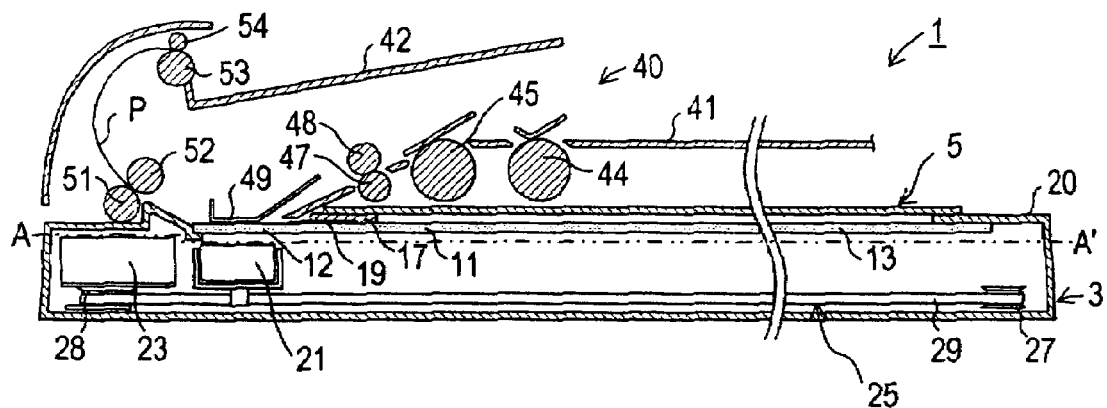
FIG. 3A is a cross-section view of the image reading apparatus 1, taken in a lengthwise direction thereof, in a state in which a second image-read place 12 is used to read an image.
Figure 3B:
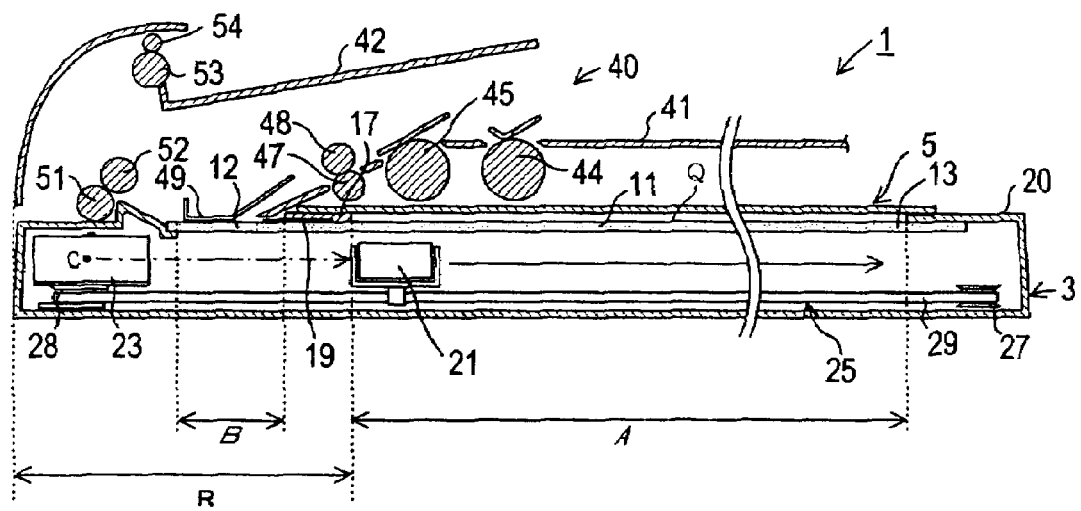
FIG. 3B is another cross-section view of the image reading apparatus 1, taken in the lengthwise direction thereof in a state in which a first image-read place 11 is used to read an image.

FIGS. 3A and 3B show a cross section of the image reading apparatus 1, taken in a lengthwise direction thereof, i.e., in a left-right direction in FIG. 1A. The main body 3 of the image reading apparatus 1 includes a platen glass 13 as a transparent plate member, a support box 20 as a housing, a positioning member 17, a white standard member 19, an image sensor 21, a stepper motor 23 as a power producing device, and a power transmitting device 25. The platen glass 13 is constituted by a planar glass plate, and defines the above-indicated first and second image-read places 11, 12. The support box 20 supports, in a top portion thereof, the platen glass 13. The positioning member 17 is for positioning an original being placed on the first image-read place 11. The stepper motor 23 produces power to be used to move the image sensor 21. The power transmitting device 25 transmits the power produced by the motor 23, to the image sensor 21, so as to move the same 21. The support box 20 has a generally rectangular parallelepiped shape, and has an upper opening in which the platen glass 13 is provided. The support box 20 is provided with glass-support portions, not shown, that support end portions of a lower surface of the platen glass 13.

As shown in FIG. 2, a rear end portion and a right-hand end portion of the platen glass 13 are covered by a frame portion 31 that extends from corresponding edges of an upper end of the support box 20, in respective directions toward a center of the same 20, substantially parallel to a bottom wall of the same 20. Thus, the platen glass 13 is prevented from coming off the support box 20. A front and left-hand end portion of the plate glass 13 is covered and fixed by a glass fixing portion 33 that extends from an edge of a front and left-hand end portion of the frame portion 31, so that the glass plate 13 does not come off the support box 20.

The platen glass 13 is separated into the first and second image-read places 11, 12 by the positioning member 17 that is detachably attached to the support box 20. The first image-read place 11 is for reading the image on the original O placed by the user, and is located in a right-hand portion of the main body 3, as shown in FIG. 2. Meanwhile, the second image-read place 12 is for reading an image formed on an original P fed by an original feeding device 40 (ADF, FIG. 4) provided in the main-body cover 5, and is located in a left-hand portion of the main body 3. The original P may be the same as, or different from, the orginal O.

The image sensor 21 is accommodated in the support box 20, such that the sensor 21 is movable, below the first and second image-read places 11, 12, i.e., the platen glass 13, in a left-right direction in FIGS. 3A and 3B. The image sensor 21 includes a light emitter, not shown, that emits a light toward an original on the platen glass 13, and a plurality of photoelectric transducers, not shown, that arranged in one or more arrays, receive the light reflected from the original, and produce respective image signals representing the read image. The image sensor 21 is constituted by a well-known "line sensor" that has an elongate light-receive surface as long as a width of the platen glass 13 as measured in a front-rear direction in FIG. 2, and continuously reads each line of the original image.

The power transmitting device 25 includes two pulleys 27, 28, and a belt 29 wound on the two pulleys 27, 28, and the image sensor 21 is fixed to a portion of the belt 29. When the belt 29 is moved by the power produced by the motor 23, the image sensor 21 is moved relative to the platen glass 13 in the left-right direction in FIGS. 3A and 3B. FIG. 3A shows a fixed position where the image sensor 21 is stopped to read the original P being fed to the second image-read place 12 by the original feeding device 40 provided in the main-body cover 5; and FIG. 3B shows a manner of movement of the image sensor 21 to read the original placed on the first image-read place 11.

When the image sensor 21 reads the original P being fed to the second image-read place 12 by the original feeding device 40 provided in the main-body cover 5, the sensor 21 is moved to, and fixed at, the fixed position below the second place 12. Meanwhile, when the image sensor 21 reads the original placed on the first image-read place 11, the sensor 21 is moved in the left-right direction, below the first place 11, by the cooperation of the stepper motor 23 and the power transmitting device 25.

The original feeding device 40 is integrally assembled with the main-body cover 5, and includes a sheet-supply tray 41 as a sheet support portion that is provided above the first image-read place 11. The original feeding device 40 feeds the original P placed on the sheet-supply tray 41 to the second image-read place 12, and discharges the original P whose image has been read in the second place 12 by the image sensor 21, into a sheet-collect tray 42.

The original feeding device 40 includes, at a start point of a sheet-feed path, two sheet-supply rollers 44, 45. When the sheet-supply rollers 44, 45 are rotated while being pressed against the original P, the original P is fed from the sheet-supply tray 41 toward a downstream-side end of the sheet-feed path. A pair of feed rollers 47, 48 are provided on a downstream side of the sheet-supply rollers 44, 45. The original P fed from the upstream side end of the sheet-feed path is pinched by the two feed rollers 47, 48. As the feed rollers 47, 48 are rotated while pinching the original P, the original P is fed toward the downstream-side end of the sheet-feed path.

On a downstream side of the feed rollers 47, 48, there is provided a hold-down plate 49 that is opposed to the second image-read place 12 such that an appropriate space is left between a lower surface of the plate 49 and an upper surface of the platen glass 13 that defines the second place 12. The original P fed from the feed rollers 47, 48 is passed through the space present between the hold-down plate 49 and the second image-read place 12, and is further fed to a pair of feed rollers 51, 52 provided on a downstream side of the plate 49.

The two feed rollers 51, 52, provided on the downstream side of the second image-read place 12, pinch the original P fed from the upstream-side portion of the sheet-feed path and, as the feed rollers 51, 52 are rotated, the original P is fed to a pair of discharge rollers 53, 54 provided in a downstream side portion of the path. The two discharge rollers 53, 54 pinch the original P received from the feed rollers 51, 52 and, as the discharge rollers 53, 54 are rotated, the original P is discharged into the sheet-collect tray 42.

Figure 4:
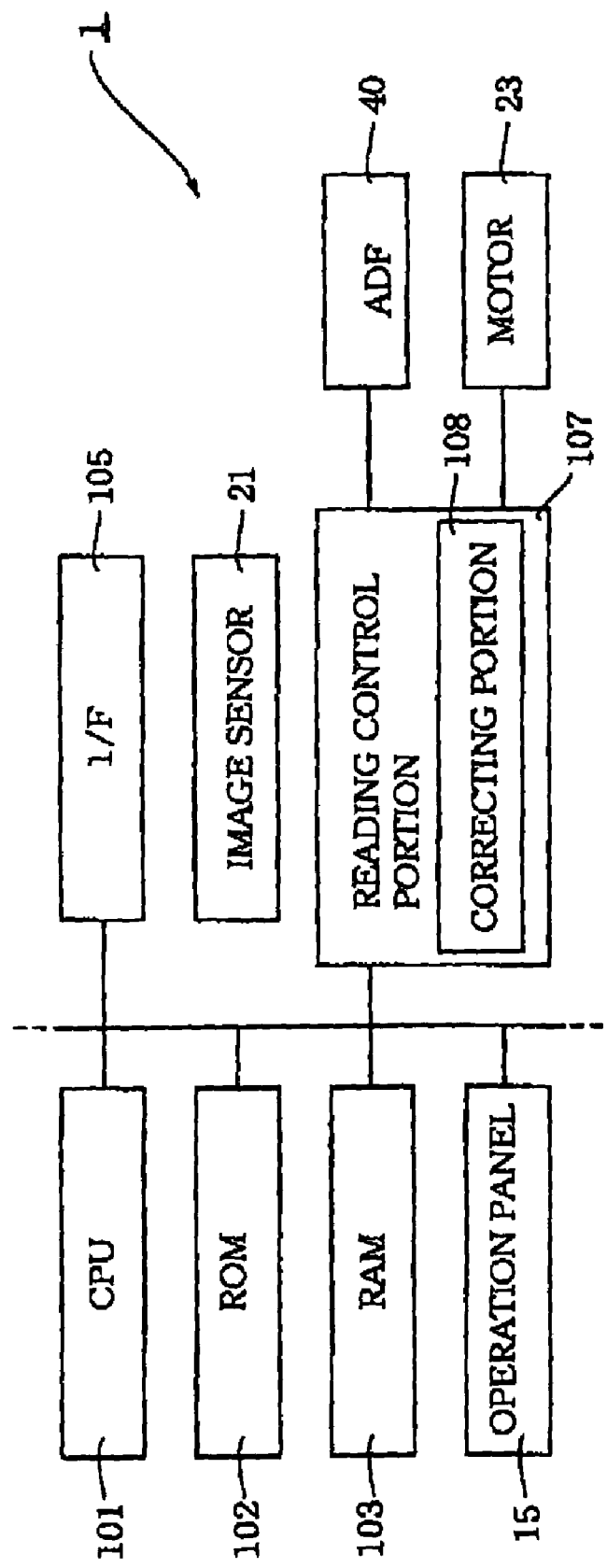
FIG. 4 is a diagrammatic view for explaining an electric arrangement of the image reading apparatus 1.

As shown in FIG. 4, the original feeding device 40 is controlled by a reading control portion 107 that is incorporated by the main body 3. In the present embodiment, the image reading apparatus 1 employs a computer including a CPU (central processing unit) 101, a ROM (read only memory) 102, a RAM (random access memory) 103, an interface (I/F) 105, the operation panel 15, and the reading control portion 107. The reading control portion 107 includes a correcting portion 108 for correct the image data obtained by the image sensor 21. The CPU 101 controls the elements 102, 103, 105, 15, 107.

Figure 5B:
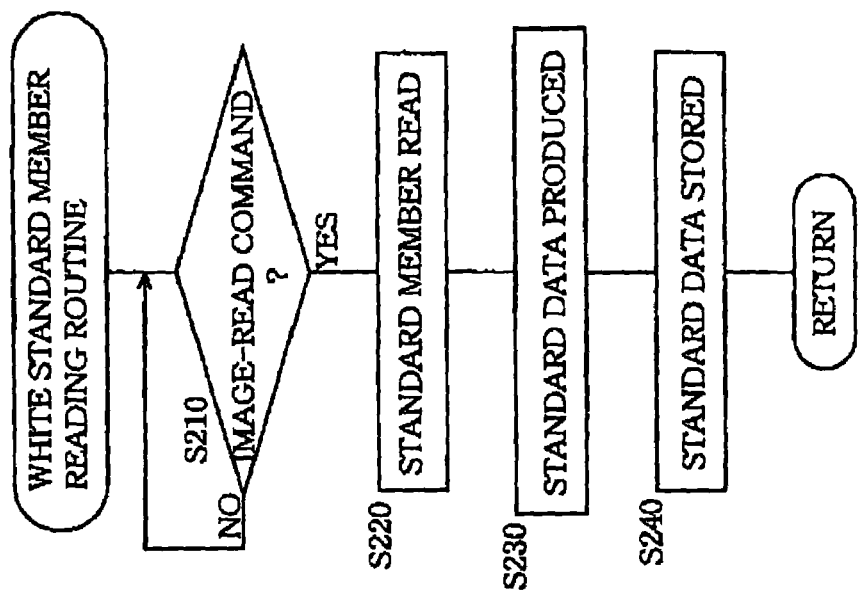
FIG. 5B is a flow chart representing a white standard reading routine that is carried out by the CPU 101.
Figure 5A:
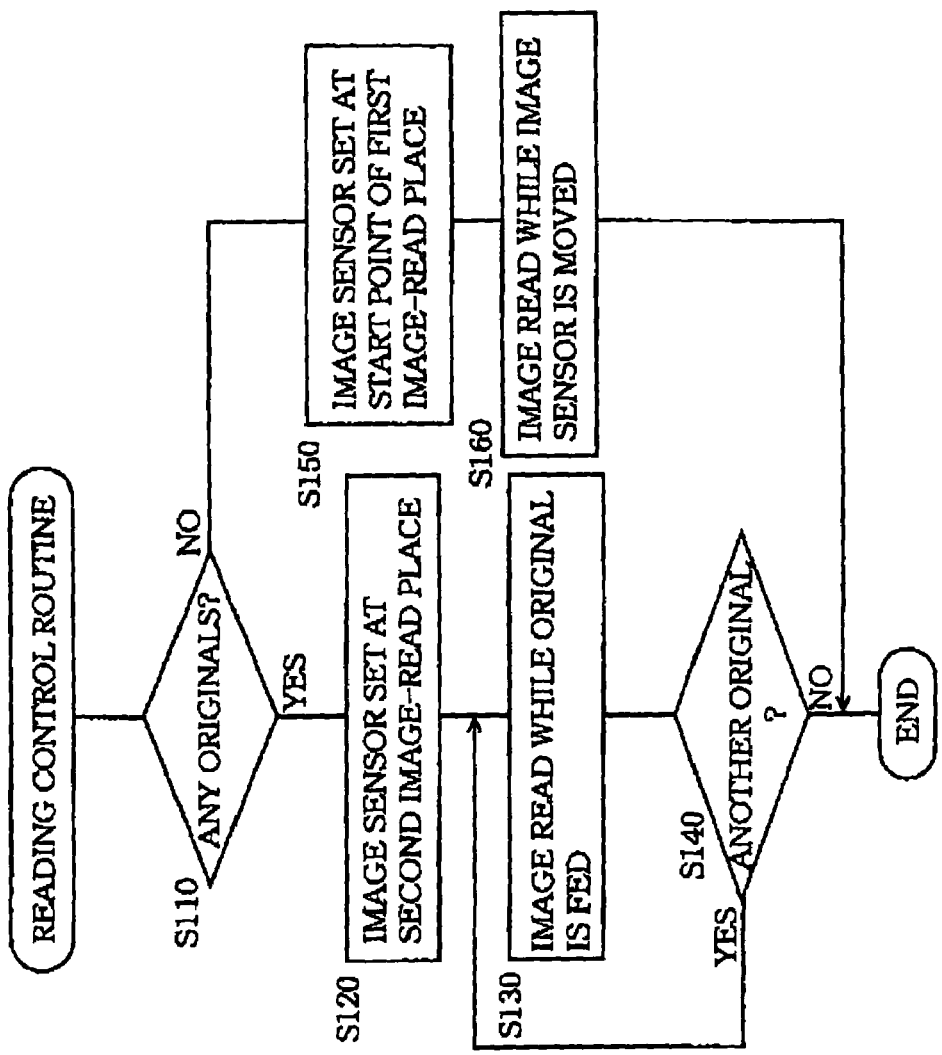
FIG. 5A is a flow chart representing a reading control routine that is carried out by a CPU 101.

More specifically described, when the user inputs an image-read command by operating the operation panel 15, the CPU 101 carries out a reading control routine that is pre-stored in the ROM 102 and is represented by a flow chart shown in FIG. 5A. First, at Step S110, the CPU 101 judges, based on an output signal supplied from a sheet sensor, not shown, whether an original P is placed on the sheet-supply tray 41 of the original feeding device (ADF) 40. If a positive judgment is made at Step S110, the control of the CPU 101 proceeds with Step S120 to supply, to the reading control portion 107, a command to move the image sensor 21 to the fixed position below the second image-read place 12.

Responsive to the above command, the reading control portion 107 controls the stepper motor 23 to move the image sensor 21 to the fixed position below the second image-read place 12, and stops the sensor 21 at the fixed position. Subsequently, at Step S130, the CPU 101 commands the reading control portion 107 to control the original feeding device 40 to feed a sheet of original P from the sheet-supply tray 41 to the second image-read place 12 and, when the original P passes over the second place 12, control the image sensor 21 to read an image formed on the original P.

The image signal outputted from the image sensor 21 is digitized by a converter circuit, not shown, as a portion of the reading control portion 107. In addition, the digitized image signal (hereinafter, referred to as the image data) is subjected, by the correcting portion 18, to a well-known shading correction based on standard data, described later. The corrected image data are temporarily stored in the RAM 103 and, under control of the CPU 101, the image data are supplied via the interface 105 to, e.g., an external device such as a personal computer or an image forming device.

Step S130 is followed by Step S140 to judge whether another sheet of original P is present on the sheet-supply tray 41. If a positive judgment is made at Step S140, the control goes back to Step S130 to carry out the above-described reading operation once more. That is, the image formed on the second original P is read, and the obtained image data are supplied via the interface 105 to the external device. On the other hand, if a negative judgment is made at Step S140, i.e., if there are no sheets of original P left on the sheet-supply tray 41, the CPU 101 quits the reading control routine.

Meanwhile, if a negative judgment is made at Step S110, i.e., if there are no sheets of original P on the sheet-supply tray 41, the control of the CPU 101 goes to Step S150 to supply, to the reading control portion 107, a command to move the image sensor 21 to a movement start point as a boundary point between the first image-read place 11 and the positioning member 17. Responsive to this command, the reading control portion 107 controls the stepper motor 23 to move the image sensor 21 to the movement start point below the first image-read place 11.

Then, the control of the CPU 101 goes to Step S160 to command the reading control portion 107 to control the stepper motor 23 to move the image sensor 21 in the space located below the first image-read place 11, in the left-right direction in FIG. 3B, and concurrently control the image sensor 21 to read the original placed on the first place 11. In short, the CPU 101 operates for controlling the image sensor 21 to read the original placed on the first image-read place 11, while moving the image sensor 21.

At Step S160, the image signal outputted from the image sensor 21 is digitized by the converter circuit of the reading control portion 107, and the thus obtained image data are subjected, by the correcting portion 108, to the well-known shading correction based on the standard data, described later. The corrected image data are temporarily stored in the RAM 103 and, under control of the CPU 101, the image data are supplied via the interface 105 to the external device.

After Step S160, the CPU 101 quits the reading control routine shown in FIG. 5A. The standard data used by the correcting portion 108 are produced and updated by the CPU 101 according to a white standard reading routine that is pre-stored in the ROM 102 and is represented by a flow chart shown in FIG. 5B.

In the white standard reading routine, first, at Step S210, the CPU 101 judges whether an original-read command has been inputted through the operation panel 15. If a positive judgment is made at Step S210, the CPU 101 carries out, before the above-described Step S120 or S150, Steps S220 through S240 described below.

At Step S220, the CPU 101 commands the reading control portion 107 to move the image sensor 21 to a position below the white standard member 19. Responsive to this command, the reading control portion 107 controls the stepper motor 23 to move the image sensor 21 to the position below the white standard member 19. Then, the CPU 101 commands the reading control portion 107 to control the image sensor 21 to read a standard white color image on the white standard member 19, and obtains an image signal representing the read standard color image, through the reading control portion 107.

Step S220 is followed by Step S230 to produce, based on the image signal representing the read standard color inage, the standard data that are to be used as correction data by the correcting portion 108 to correct the image data read or obtained from the original, by subjecting the image data to the shading correction. At Step S240, the CPU 101 stores, in the RAM 103, the standard data as the correction data that were obtained at Step S230, so that the standard data may be read out of the RAM 103 by the correcting portion 108 and be used in the shading correction. Then, the CPU 101 quits the standard white reading routine.

Figure 6:
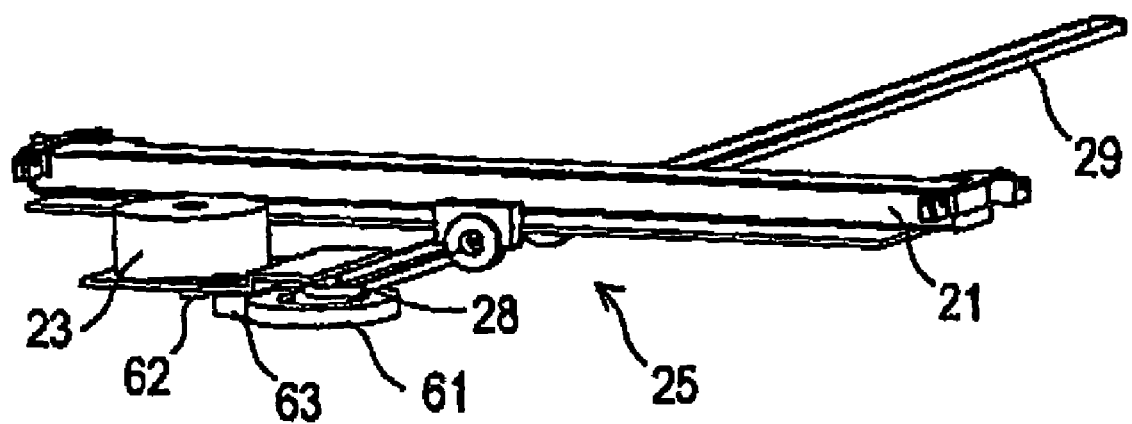
FIG. 6 is a perspective view of an arrangement of an image sensor 21 and a stepper motor 23 that are connected to each other via a power transmitting device 25.

Meanwhile, in the present embodiment, the image sensor 21, the stepper motor 23, and the power transmitting device 25 are accommodated in the support box 20 in a positional relationship shown in FIGS. 6, 7A, and 7B. FIG. 6 is a perspective view showing an arrangement of the image sensor 21 and the stepper motor 23 that are connected to each other by the power transmitting device 25; FIG. 7A shows a cross section of the main body 3, taken in a widthwise direction thereof, i.e., a front-rear direction in FIG. 1; and FIG. 7B shows a cross section of the main body 3, taken along A-A' in FIG. 3A.

As described above, the power transmitting device 25 includes the two pulleys 27 28 and the belt 29 wound on the pulleys 27, 28. The pulley 27 is located on a right-hand end portion of the bottom wall of the support box 20 and a widthwise middle portion of the bottom wall, and is rotatable about an axis line perpendicular to the bottom wall. Meanwhile, the pulley 28 is located on a left-hand end portion of the bottom wall of the support box 20 and a widthwise middle portion of the bottom wall, and is rotatable about an axis line perpendicular to the bottom wall.

The pulley 28 is connected to a gear 61 that is meshed with a gear 63 that in turn is meshed with a gear 62 attached to an output shaft of the stepper motor 23. Thus, the pulley 28 receives the power of the motor 23 via the gears 61, 62, 63, and is rotated about the axis line perpendicular to the bottom wall of the support box 20. The power of the motor 23 is transmitted via the rotation of the pulley 28 to the belt 29, so that the belt 29 is moved along a straight line connecting between the pulleys 27, 28.

As shown in FIG. 3B, the stepper motor 23 is provided in a projection space R that is offset, in the support box 20, in a leftward direction from a space below the first image-read place 11 ("A") and is occupied by a projection of the original feeding device 40 taken in a vertically downward direction. More specifically described, the motor 23 is provided in a left-hand end portion of an inner space of the support box 20 that is offset in the leftward direction from a portion of the inner space that is located below the platen glass 13, and is located at a position in rear of the pulley 28.

The stepper motor 23 is fixed in the support box 20, such that an axis line about which the output shaft of the motor 23 is rotated is parallel to a vertical direction perpendicular to the direction in which the image sensor 21 is moved, and such that the output shaft of the motor 23, connected to the gear 62, is oriented in the downward direction.

In addition, the stepper motor 23 is located relative to the image sensor 21, such that when a vertically middle point C of a main body of the stepper motor 23 is projected in the left-right direction in which the sensor 21 is moved, the projection of the middle point C is formed on a side surface of the image sensor 21, as indicated at one-dot chain line in FIG. 3B. The stepper motor 23, located in this way, drives the belt 29 via the gear 62 connected to the output shaft of the motor 23.

Like the stepper motor 23, the image sensor 21 is provided in the support box 20, such that the sensor 21 is oriented in an upward direction from the belt 29. Since the image sensor 21 is fixed to the belt 29, the sensor 21 is moved in the left-right direction in the support box 20, as the belt 29 is moved in the same direction by the motor 23.

As is apparent from the foregoing description of the image reading apparatus 1, the stepper motor 23 is provided at the position assuring that when the motor 23 is projected in the direction in which the image sensor 21 is moved, the projection of the motor 23 is at least partly formed on the image sensor 21, and in particular the projection of the vertically center point C of the motor 23 is formed on the sensor 21. Therefore, the present image reading apparatus 1 can enjoy a reduced thickness in a vertical direction, i.e., a direction perpendicular to the direction of movement of the image sensor 21 and the direction of extension of the image sensor 21, as compared with a conventional image reading apparatus in which an electric motor is provided below a space in which an image sensor is moved. Thus, the present image reading apparatus 1 can enjoy a flatter configuration.

In addition, in the above-described embodiment, both the stepper motor 23 and the image sensor 21 are provided above the belt 29 in the inner space of the support box 20. Therefore, the present image reading apparatus 1 can enjoy a flatter configuration than that of a conventional image reading apparatus in which an image sensor is provided above a belt supporting the sensor, and an electric motor is provided below the belt.

Moreover, in the above-described embodiment, the stepper motor 23 is provided in the projection space R that is occupied by the projection of the original feeding device 40, taken in the downward direction, and excludes any portions of the space located below the first image-read place 11. Therefore, a redundant space that is produced in the support box 20 by the employment of the original feeding device 40 can be effectively utilized. Thus, the image reading apparatus 1 need not have an increased length in the left-right direction in FIG. 2.

In particular, in the above-described embodiment, the stepper motor 23 whose diameter or width is comparatively large relative to its axial length is employed as the power producing device that produces the power to move the image sensor 21. Therefore, the motor 23 is provided such that the axial direction of the motor 23 is parallel to the vertical direction, i.e., the direction of thickness of the image reading apparatus 1. Thus, the motor 23 is accommodated in the support box 20 while the thickness of the box 20 need not be increased.

In addition, in the above-described embodiment, the original feeding device 40 and the main-body cover 5 are integrally formed. Thus, the image reading apparatus 1 as a whole can enjoy a simple construction. Moreover, the sheet-supply tray 41 is provided above the first image-read place 11, the image reading apparatus 1 as a whole, including the original feeding device 40, can enjoy a small length, and accordingly a smaller size.

Meanwhile, in the above-described embodiment, the stepper motor 23 is provided at the position assuring that when the vertically center point C of the motor 23 is projected in the direction in which the image sensor 21 is moved by the motor 23, the projection of the center point C is formed on the sensor 21. However, a stepper motor may be provided at a position where an upper surface of the motor is aligned with an upper surface of an image sensor that can be opposed to an original as shown in FIG. 8.

Figure 8:
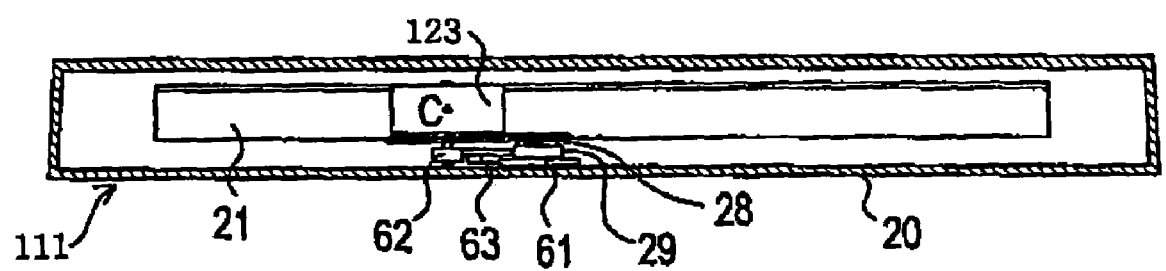
FIG. 8 is a cross-section view corresponding to FIG. 7A, showing another image reading apparatus 111 as a second embodiment of the present invention.

FIG. 8, corresponding to FIG. 7A, shows a second embodiment of the present invention that relates to another image reading apparatus 111 employing another stepper motor 123. The second embodiment differs from the first embodiment, shown in FIGS. 1A through 7B, only in that the stepper motor 123 differs from the stepper motor 23 with respect to size and position. Therefore, the same reference numerals as used in the first embodiment are used to designate the corresponding elements or parts of the second embodiment, and the description thereof is omitted.

In the image reading apparatus 111, the stepper motor 123 is provided in the above-described projection space R (see FIG. 3B), such that an upper surface of the motor 123 is aligned with an upper surface of the image sensor 21 in the vertical direction, i.e., in the direction of thickness of the support box 20. In addition, when a vertically center point C of the motor 123 is projected in the direction in which the sensor 21 is moved by the motor 123, the projection of the center point C is formed on the sensor 21. Thus, the image reading apparatus 111 can enjoy a still flatter configuration.

In the above-described image reading apparatuses 1, 101, the image sensor 21 provides an image taking device; the CPU 101 and a portion of the reading control portion 107 that carries out Step S160 cooperate with each other to provide a first reading portion; the CPU 101 and a portion of the reading control portion 107 that carries out Step S130 cooperate with each other to provide a second reading portion; and the sheet-supply tray 41 of the original feeding device 40 provides a sheet-support portion of the same 40.

While the present invention has been described in its preferred embodiments, it is to be understood that the present invention is by no means limited to the details of the described embodiments but may otherwise be embodied.

For example, in each of the above-described embodiments, the sheet-feed path of the original feeding device 40 has a generally U-shaped configuration. However, the present invention is applicable to an image reading apparatus employing an original feeding device having a different construction, as shown in FIG. 9.

Figure 9:
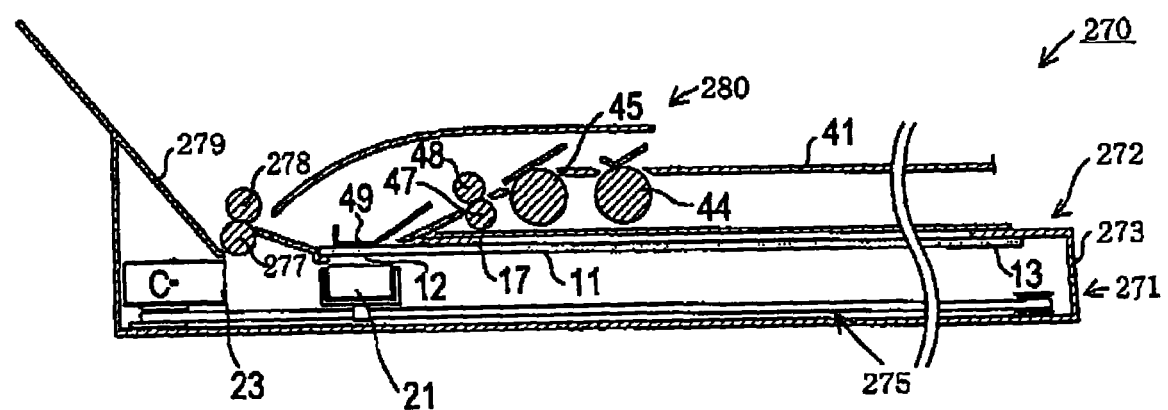
FIG. 9 is a cross-section view corresponding to FIG. 3A, showing another image reading apparatus 270 as a third embodiment of the present invention that employs an original feeding device 280 whose sheet-feed path has a generally L-shaped configuration.

FIG. 9, corresponding to FIG. 3A, shows a third embodiment of the present invention that relates to another image reading apparatus 270 employing an original feeding device 280 whose sheet-feed path has a generally L-shaped configuration. The image reading apparatus 270 includes a main body 271, and a main-body cover 272 including the original feeding device 280. The third embodiment differs from the first embodiment, shown in FIGS. 1A through 7B, only in that the original feeding device 280 and the original feeding device 40 have different sheet-feed paths. Thus, an electric arrangement of the image reading apparatus 270 is substantially identical with the electric arrangement of the image reading apparatus 1, shown in FIG. 4. The same reference numerals as used in the first embodiment are used to designate the corresponding elements or parts of the third embodiment, and the description thereof is omitted.

Like the original feeding device 40, the original feeding device 280 includes the sheet-supply tray 41, the sheet-supply rollers 44, 45, the feed rollers 47, 48, and the hold-down plate 49, and is adapted to feed the original placed on the tray 41, to the second image-read place 12. Meanwhile, the main body 271 includes two discharge rollers 277, 278 that cooperate with each other to pinch the original that has been fed over the second image-read place 12 and discharge, by rotation thereof, the original into a sheet-collect tray 279 integrally formed with a support box 273 of the main body 271.

The support box 273 incorporates the image sensor 21, the stepper motor 23 to produce the power to move the sensor 21, and a power transmitting device 275. The motor 23 is provided in a space below the sheet-collect tray 279 located in a left-hand end portion of the support box 273, such that a projection of a vertically center point C of the motor 23, taken in the direction in which the sensor 21 is moved by the motor 23, is formed on the sensor 21.

Like the stepper motor 23 of the image reading apparatus 1, the stepper motor 23 of the present image reading apparatus 270 is provided such that an axis line about which the output shaft of the motor 23 rotates is perpendicular to the direction in which the image sensor 21 is moved by the motor 23, i.e., in the lengthwise direction of the support box 273. In addition, like the motor 23, the sensor 21 is provided in the space present between the power transmitting device 275 and the platen glass 13 located above the device 275.

In the present image reading apparatus 270, the stepper motor 270 is provided in a redundant space of the support box 273 that is located below the sheet-collect tray 279. Thus, the inner space of the support box 273 is effectively utilized. Therefore, dimensions of the support box 273 can be reduced with respect to thickness and lengthwise dimension.

It is to be understood that the present invention may be embodied with various changes, modifications, and improvements that may occur to a person skilled in the art without departing from the spirit and scope of the invention defined in the appended claims.

What is claimed is:

1. An image reading apparatus, comprising:
a housing having an inner space;
an image taking device which is provided in the inner space of the housing and which takes each of a first image on a first sheet placed on a first reading area and a second image on a second sheet fed to a second reading area;
a power producing device which is provided in the inner space of the housing and which produces a power to move the image taking device to each of the first reading area and the second reading area;
a first reading control portion which controls the power producing device to move the image taking device relative to the first sheet placed on the first reading area, so that the image taking device takes the first image from the first sheet;
a second-sheet feeding device which includes a first portion provided right above at least the second reading area, and a second portion different from the first portion and which feeds the second sheet to the second reading area; and
a second reading control portion which controls, in a state in which the image taking device is positioned at a position right below the second reading area, the second-sheet feeding device to feed the second sheet to the second reading area, and controls, when the second sheet is fed through the second reading area, the image taking device to take the second image from the second sheet, wherein the power producing device is provided, in a second portion of the inner space of the housing that is different from a first portion of the inner space that is located right below the first and second reading areas, at a position assuring that a projection of at least a portion of the power producing device in a projection direction parallel to a movement direction in which the image taking device is moved by the power producing device, is formed on the image taking device, and wherein the second portion of the inner space is located right below the second portion of the second-sheet feeding device.

2. The image reading apparatus according to claim 1, wherein the power producing device is provided at a position assuring that a projection of a vertically middle point of the power producing device in the projection direction is formed on the image taking device.

3. The image reading apparatus according to claim 1, wherein the power producing device is provided such that an upper surface of the power producing device is aligned, with respect to a vertical direction, with an upper surface of the image taking device that can be opposed to each of the first sheet placed on the first reading area and the second sheet fed to the second reading area.

4. The image reading apparatus according to claim 1, further comprising a power transmitting device which transmits the power produced by the power producing device to the image taking device, so as to move the image taking device in the movement direction, wherein the power producing device and the image taking device are provided on a same side of the power transmitting device with respect to a vertical direction.

5. The image reading apparatus according to claim 4, wherein the power transmitting device includes two pulleys which are distant from each other in the movement direction, and a belt which is wound on the two pulleys and extends in the movement direction, and wherein the power producing device and the image taking device are provided on a same side of the belt with respect to the vertical direction.

6. The image reading apparatus according to claim 5, comprising a transparent plate member defining the first reading area and the second reading area, wherein the image taking device is provided between the belt and the transparent plate member.

7. The image reading apparatus according to claim 5, wherein the power producing device includes an electric motor which is provided such that an axis line about which an output shaft of the electric motor is rotated is perpendicular to the movement direction and the first and second reading areas, and such that the output shaft of the electric motor is connected to one of the two pulleys in a direction perpendicular to the movement direction and the axis line.

8. The image reading apparatus according to claim 1, wherein the first portion of the second-sheet feeding device includes a second-sheet support portion which supports the second sheet and which is provided right above the first reading area, and wherein the second reading control portion controls the second-sheet feeding device to feed the second sheet from the second-sheet support portion to the second reading area, and controls, when the second sheet is fed through the second reading area, the image taking device to take the second image from the second sheet.

9. The image reading apparatus according to claim 1, wherein the power producing device includes an electric motor which is provided such that an axis line about which an output shaft of the electric motor is rotated is perpendicular to the first and second reading areas.

10. The image reading apparatus according to claim 9, wherein the electric motor comprises a stepper motor.

11. The image reading apparatus according to claim 1, further comprising a cover member which covers the first reading area when the image taking device takes the first image from the first sheet, wherein the second-sheet feeding device is integrally assembled with the cover member.

12. The image reading apparatus according to claim 11, wherein the cover member is pivotable in a first direction away from the housing so as to allow the first sheet to be placed on the first reading area by a user, and in a second direction toward the housing so as to allow the second sheet to be fed to the second reading area by the second-sheet feeding device.

13. The image reading apparatus according to claim 1, wherein the second-sheet feeding device includes, as the second portion thereof, a second-sheet collecting portion which collects the second sheet fed through the second reading area, wherein the power producing device is provided in the second portion of the inner space of the housing that is located right below the second-sheet collecting portion.

14. The image reading apparatus according to claim 1, wherein the image taking device includes a plurality of image sensing elements arranged in at least one array in a direction perpendicular to the movement direction and parallel to the first and second reading areas.

15. The image reading apparatus according to claim 1, wherein the first reading control portion comprises a computer which controls the image taking device and the power producing device.

16. The image reading apparatus according to claim 1, wherein the second reading control portion comprises a computer which controls the image taking device, the power producing device, and the second-sheet feeding device.

17. The image reading apparatus according to claim 1, wherein the first portion of the second-sheet feeding device is provided right above the first and second reading areas.

18. The image reading apparatus according to claim 17, wherein the second-sheet feeding device includes, as the second portion thereof, a second-sheet collecting portion which collects the second sheet fed through the second reading area, and wherein the second portion of the inner space of the housing is located right below the second-sheet collecting portion.

19. The image reading apparatus according to claim 1, wherein the second-sheet feeding device includes, as the second portion thereof, a U-shaped sheet-feed path along which the second sheet is fed in a first direction from the second reading area and is further fed in a second direction having a component opposite to the first direction, and wherein the second portion of the inner space of the housing is located right below the U-shaped sheet-feed path.

20. The image reading apparatus according to claim 1, wherein the power producing device is fixedly provided relative to the housing.

* * * * *